United States Patent
Kochan, Jr.

(10) Patent No.: US 10,827,053 B2
(45) Date of Patent: Nov. 3, 2020

(54) MESSAGE PROJECTOR

(71) Applicant: Metropolitan Industries, Inc., Romeoville, IL (US)

(72) Inventor: John R. Kochan, Jr., Naperville, IL (US)

(73) Assignee: Metropolitan Industries, Inc., Romeoville, IL (US)

( * ) Notice: Subject to any disclaimer, the term of this patent is extended or adjusted under 35 U.S.C. 154(b) by 0 days.

(21) Appl. No.: 16/418,639

(22) Filed: May 21, 2019

(65) Prior Publication Data

US 2019/0356766 A1 Nov. 21, 2019

Related U.S. Application Data

(60) Provisional application No. 62/674,187, filed on May 21, 2018.

(51) Int. Cl.
| | | |
|---|---|---|
| *H04M 1/02* | (2006.01) | |
| *H04M 1/725* | (2006.01) | |
| *G03B 21/14* | (2006.01) | |
| *H04N 21/41* | (2011.01) | |

(52) U.S. Cl.
CPC ........ *H04M 1/0272* (2013.01); *G03B 21/145* (2013.01); *H04M 1/72547* (2013.01); *H04N 21/4122* (2013.01)

(58) Field of Classification Search
CPC ............ H04M 1/0272; H04M 1/72547; G03B 21/145; H04N 21/4122
See application file for complete search history.

(56) References Cited

U.S. PATENT DOCUMENTS

| | | | | |
|---|---|---|---|---|
| 2012/0287090 | A1* | 11/2012 | Cacioppo | G06F 3/043 345/179 |
| 2013/0314597 | A1* | 11/2013 | Kumamoto | H04N 5/7475 348/552 |
| 2013/0314677 | A1* | 11/2013 | Rodriguez, Jr. | G03B 17/54 353/119 |
| 2015/0305087 | A1* | 10/2015 | Leigh Blakeney | H04M 1/72533 348/744 |
| 2017/0142379 | A1* | 5/2017 | Kihara | H04N 9/3179 |
| 2017/0187106 | A1* | 6/2017 | Hashimoto | H01Q 3/06 |
| 2018/0139419 | A1* | 5/2018 | Khubani | H04N 9/3185 |

* cited by examiner

*Primary Examiner* — Mazda Sabouri
(74) *Attorney, Agent, or Firm* — Husch Blackwell LLP; George S. Pavlik

(57) ABSTRACT

A message projecting device is provided. The device comprises a lens, an optical display having light-modulating capability, a light source, a communication port and circuitry coupled to the communication port and optical display. Light generated by the light source can be directed through the optical display and lens. A communication port can be configured to electronically couple the projecting device to a nearby electronic device. A communication signal received by the electronic device can be relayed to the message projector and be received by the communication port. Information carried on the communication signal can be recovered and conveyed to the optical display via the circuitry. A virtual image embodying the information can be generated by the optical display and projected through the lens onto a nearby display surface.

8 Claims, 1 Drawing Sheet

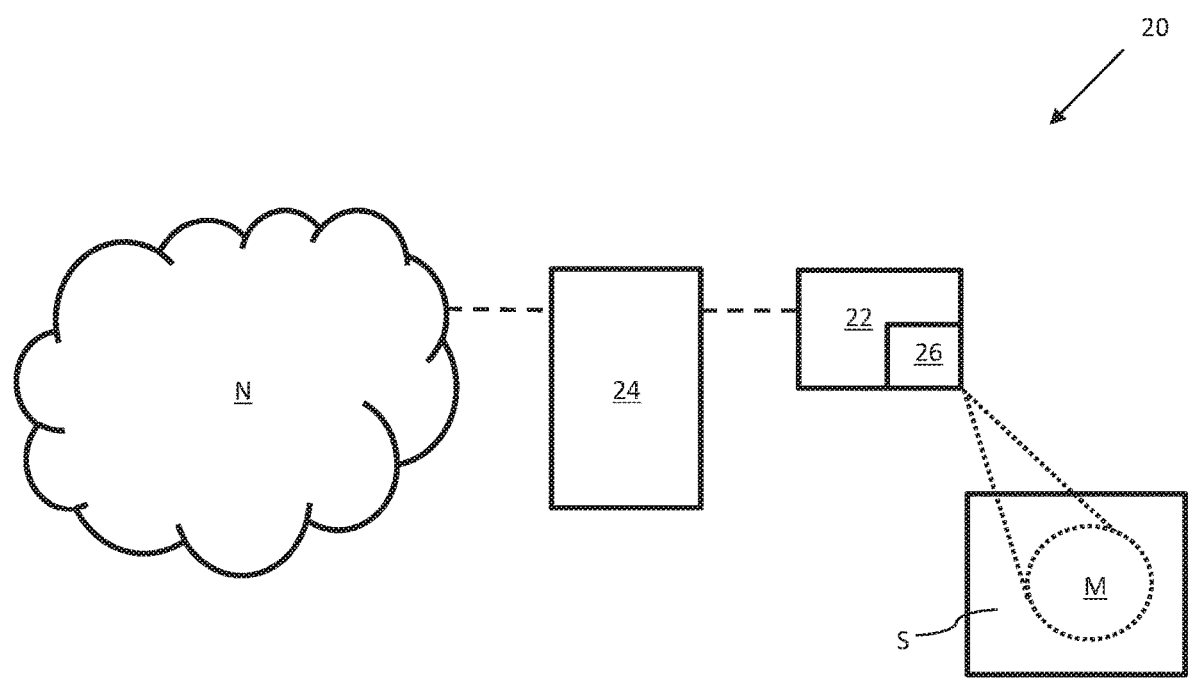

MESSAGE PROJECTOR

CROSS-REFERENCE TO RELATED APPLICATION

This application claims the benefit of the filing date of U.S. Provisional Patent Application Ser. No. 62/674,187 filed May 21, 2018, entitled "Message Projector," the entirety of which is hereby incorporated by reference as if set forth fully herein.

FIELD

Embodiments presented herein relate generally to a device and method of displaying projecting notifications or communications received by a wireless mobile device, and more specifically to a projector that can be electronically coupled to a mobile device and can project text, images and other information received by the device onto an ambient display surface.

BACKGROUND

Systems and methods for displaying notifications of incoming messages on a mobile device are known in the art. However, when a user of the device is removed from or not actively looking at the display screen of mobile device, locating and accessing the mobile device to read the notification can be difficult, inconvenient and time consuming.

In view of the above, there is a continuing, ongoing need for improved systems and methods to display notification information received on a mobile device.

BRIEF DESCRIPTION OF THE DRAWINGS

FIG. 1 is a block diagram of a system according to an exemplary embodiment disclosed herein.

DETAILED DESCRIPTION

While this invention is susceptible of embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein are directed to a message projector. The message projector can reduce difficulty, stress, and time associated with reading new messages and/or other information received by a computer or other wireless mobile device, such as, for example, a smart phone or electronic tablet. For example, the message projector can minimize disturbance, noise, and fumbling for the mobile device and avoid having to physically access and read the notification on the device's display screen. For instance, according to embodiments presented herein, when a notification is received and a user is lying in bed or engaged in another activity (e.g., watching television, cooking, cleaning), the user is able to review the notification without having to physically pick up and access the device (i.e., locate the mobile device in a dark room, enter login credentials, open the notification application). Embodiments can further enable a user to access/display notification information without having to locate eyeglasses to be able to enter login credentials for accessing the message. In particular, the projector can be set to project information in an enlarged form onto a nearby display surface via DLP or other image/illumination imaging sources such as, for example, LEDs, optical display devices having light-modulating capability (e.g., LCDs), LCoS, laser light or LBS.

The message projector as disclosed herein can be a small wired or wireless device that can be placed on any surface and be able to project notifications and accompanying media (graphics, photos, video) onto an ambient wall or ceiling to allow a user to read any incoming notification received by the mobile device without having to locate and access the device. The message projector can consist of a compact lighted projector type lens that can be focused on a desired projection surface. The message projector can communicate with the mobile device using Bluetooth, Wi-Fi, or other wireless connectivity means.

According to embodiments presented herein, the message projector can include a battery for wireless operation and a charging port. For example, the message projector can be set on a night stand and connected to a mobile device via Bluetooth, Wi-Fi, or other wireless connectivity means. According to exemplary embodiments, the message projector can be programmable and/or pre-programmed to remain in sleep mode until an incoming message (e.g., text message, e-mail, Facebook messenger notification, Skype message, app notification, etc.) is received by the mobile device. In some embodiments, the specific message type that will be projected can be selected by user input to the mobile device to the message projector (with other types of messages/notifications being filtered from generating a projection instruction). When the message is received by the mobile device, the message projector can receive a signal from the device to activate or wake up, with the same or separate follow-on signal being received to project the message on a desired surface. Thus allowing a user to read the message with minimum disturbance, no noise and no fumbling for the mobile device and/or eyeglasses.

FIG. 1 is a block diagram of an exemplary system 20 according to disclosed embodiments. System 20 can include a message projector 22 and a mobile device 24. The message projector 22 can include a lens 26 and a light source and can be wirelessly coupled to the mobile device 24. The message projector 22 can further include a communication port, circuitry for receiving and demodulating incoming communication signals and a programmable processor or controller. The mobile device 24 can be coupled via wireless or wired means to a network N (e.g., the Internet, local network, cellular network, etc.). The mobile device 24 can receive a variety of incoming messages or notifications from the network N via wired or wireless communication signals. The incoming messages can be passed to the message projector 22 which can receive such messages via communication signals received through a wired or wireless interface or the communication port. Upon receipt of the communication signal carrying message, the message projector 22 can process or demodulate the communication signal into visual form and visually display incoming messages M on a selected surface S using the lens 26.

According to exemplary embodiments, the incoming messages M can include text and/or images (i.e., static images or dynamic (video) images). In some embodiments, the mobile device 24 can filter a type of message sent to the message projector 22 based on a preconfigured selection. In some embodiments, the selection can include a time period in which the mobile device 24 will send all messages or messages of a particular type to the message projector 22.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A message projecting device comprising:
a lens;
an optical display having light-modulating capability;
a light source, light generated by the light source being directed through the optical display and the lens;
a communication port configured to electronically couple the message projecting device to a nearby electronic device;
circuitry coupled to the communication port and the optical display, the circuitry being configured to process information carried on a communication signal transmitted from the nearby electronic device and received by the communication port to determine whether the information carried on the communication signal matches one or more preconfigured settings being selectable by user input received via the nearby electronic device;
when the information carried on the communication signal matches the one or more preconfigured settings, the circuitry is configured to automatically recover and transmit the information carried on the communication signal to the optical display and a virtual image embodying the information is generated by the optical display and projected through the lens onto a nearby display surface;
when the information carried on the communication signal does not match the one or more preconfigured settings, the circuitry is configured to refrain from transmitting the information carried on the communication signal to the optical display, and
wherein the one or more preconfigured settings can comprise a defined time period, wherein a first electronic message received by the nearby electronic device during the defined time period causes the nearby electronic device to transmit a corresponding first communication signal to the message projecting device for display of information contained within the first electronic message, and wherein a second electronic message received by the nearby electronic device outside the defined time period will be blocked from being transmitted to the message projecting device.

2. The message projecting device as in claim 1, further comprising a wireless power source.

3. The message projecting device as in claim 1 wherein the message projecting device is programmable to be in an inactive state until receipt of the communication signal, the inactive state being terminated by the receipt of the communication signal with the message projecting device being energized into an active state.

4. The message projecting device as in claim 1 wherein the one or more preconfigured settings is selectable by user input received via the message projecting device.

5. The message projecting device as in claim 1 wherein the one or more preconfigured settings is selectable from an electronic message format associated with an electronic communication received by the nearby electronic device.

6. A method comprising:
a communication port of a message projecting device, receiving a communication signal from an electronic device, wherein the communication signal includes a notification alert and message data;
responsive to receiving the communication signal, one or more circuitry components of the message projecting device processing the communication signal to identify the notification alert and the message data;
responsive to processing the communication signal, the one or more circuitry components storing a time entry associated with a time the communication port receives the communication signal;
the one or more circuitry components determining whether the communication signal matches the electronic message format setting, wherein the electronic message format setting includes a programmed electronic message format setting to display the message data associated with one or more programmed application formats;
when the one or more circuitry components determines that the communication signal matches the time setting and the electronic message format setting, the one or more circuitry components transmitting an activation signal to the optical display system;
when the one or more circuitry components determines that the communication signal does not match the time setting and the electronic message format setting, the one or more circuitry components refraining from transmitting the activation signal to the optical display system;
responsive to the optical display system receiving the activation signal from the one or more circuitry components, the optical display system automatically projecting the message data on the display surface;
responsive to identifying the notification alert, the one or more circuitry components determining whether at least one of the communication signal and notification alert matches one or more programmable settings, wherein the one or more programmable settings include at least one of a time setting and an electronic message format setting;
when the one or more circuitry components determines that the notification alert matches the one or more programmable settings, the one or more circuitry components transmitting the message data to an optical display system;
when the one or more circuitry components determines that the notification alert does not match the one or more programmable settings, the one or more circuitry components refraining from transmitting the message data to the optical display system; and
responsive to receiving the message data, the optical display system initiating projection of the message data onto a display surface.

7. The method as in claim 6, further comprising:
the one or more circuitry components storing one or more user log-in credentials in a memory device of the one or more circuitry components;
when the one or more circuitry components determines that the notification alert matches the one or more programmable settings, the one or more circuitry components retrieving the one or more user log-in credentials from the memory device of the one or more circuitry components;
responsive to the one or more circuitry components retrieving the one or more user log-in credentials, the one or more circuitry components transmitting the message data to the optical display system; and
responsive to receiving the message data, the optical display system initiating projection of the message data onto the display surface.

8. The method as in claim 6, wherein the message data includes one or more of:
   text;
   static images; and
   dynamic video images.

* * * * *